Oct. 20, 1959  B. W. O'NEAL  2,909,137
APPARATUS FOR LEAD WELDING OF ROOF FLASHINGS
Filed Aug. 12, 1957
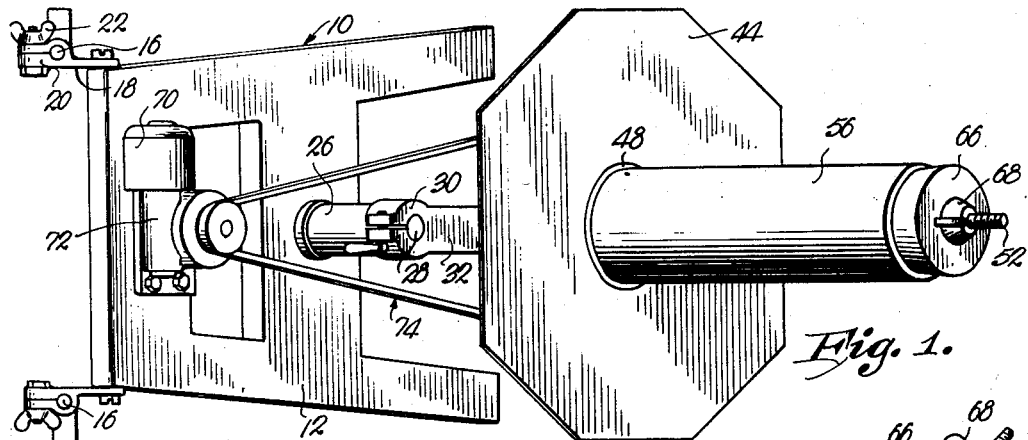
Fig. 1.
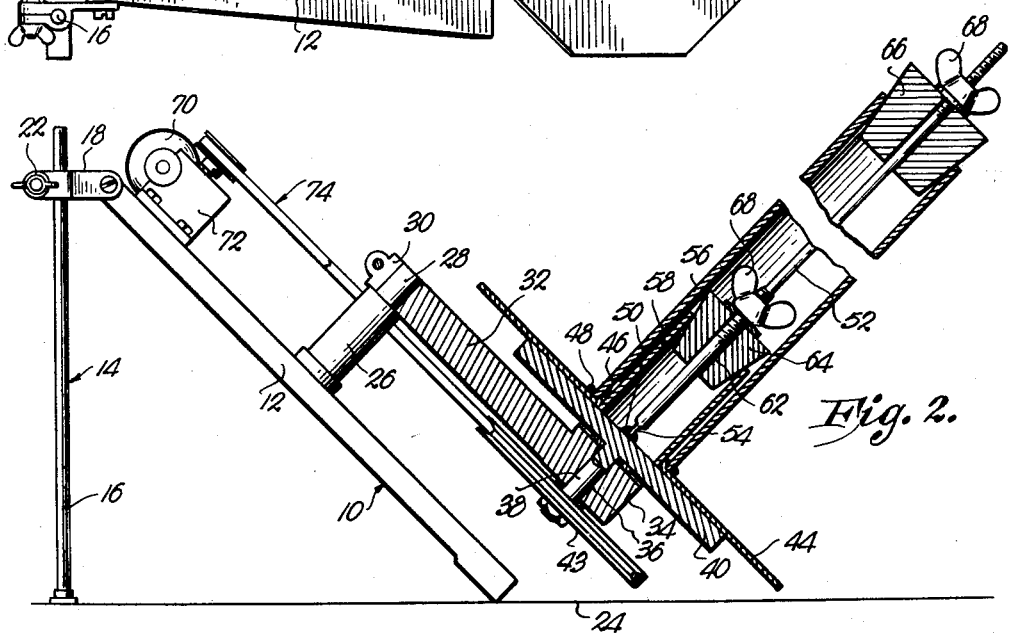
Fig. 2.
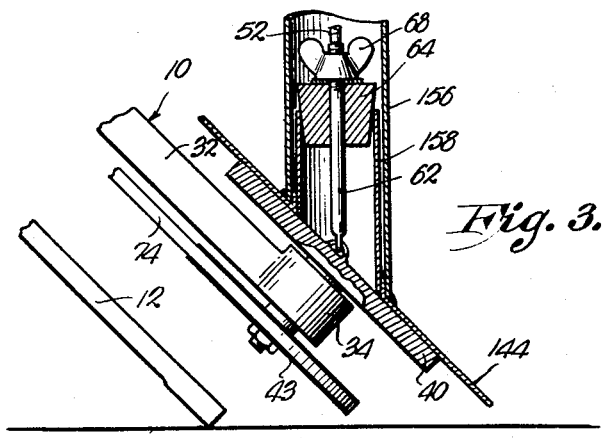
Fig. 3.
INVENTOR.
BERT W. O'NEAL
BY
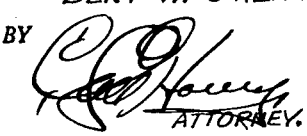
ATTORNEY.

2,909,137
APPARATUS FOR LEAD WELDING OF ROOF FLASHINGS

Bert W. O'Neal, Kansas City, Mo.

Application August 12, 1957, Serial No. 677,728

4 Claims. (Cl. 113—99)

This invention relates generally to the field of welding and, more particularly, to an improved welding jig for facilitating lead welding of tubular members to flat roof flashings.

Considerable difficulty had heretofore been experienced during the construction of vent pipes or similar stacks adapted to be utilized on building roofs, because of the fact that in lead welding the tubular members to the perforated roof flashings, no satisfactory means was available for holding and/or rotating the pieces during welding. The problems encountered included overheating of the workpieces before the welding was accomplished, thereby causing what is known in the trade as "burn-through" and, furthermore, relatively unsuccessful attempts to maintain the molten material produced during the welding at a predetermined part of the workpieces.

It is therefore the most important object of this invention to provide a welding jig for facilitating welding of a tubular member to a perforated workpiece so as to preclude burn-through of the workpieces during the welding and to assure a uniform weld between the workpieces.

Another important object hereof is to provide a jig for holding the workpieces to be welded in proper relative disposition and which includes means for effectively dissipating the heat produced, at a predetermined rate, at the area being welded to thereby preclude burn-through of the workpieces.

Additional objects hereof include the provision of a welding jig for facilitating welding of tubular members to perforated workpieces irrespective of the angular disposition of the tubular member with respect to the workpiece; the provision of means for maintaining the workpiece in register with the perforation of the plate during the welding operation and to also maintain means for dissipating heat from the welding area in proper relationship to the workpieces; to the provision of a tiltable turntable for receiving the workpieces so that the line of engagement between the tubular member and the plate is always maintained at an angle during the welding operation to thereby assure maintenance of the molten material at a position on the line of engagement so that the material does not gravitate away from the portion thereof which is being heated; and other important objects and details of construction which will be more fully described hereinafter.

In the drawing:

Figure 1 is a plan view of a welding jig embodying the concepts of the instant invention;

Fig. 2 is a side elevational view of the invention, certain portions thereof being broken away and in vertical cross-section to illustrate details of construction; and Fig. 3 is a fragmentary view similar to the broken away view of Fig. 2 and illustrating a modified form of the invention.

Welding jig 10 includes a relatively flat, elongated frame 12 adapted to be disposed at an angle to a horizontal plane by virtue of support means broadly designated by the numeral 14 and which includes a pair of spaced, elongated, upright rods 16 and a clamp 18 reciprocably mounted on each of the same. Each of the clamps 18 is pivotally attached to the normally uppermost end of frame 12 and clamps 18 have a jaw portion 20 in surrounding relationship to corresponding rods 16 and which are movable into engagement with respective rods 16 by virtue of take-up means 22.

The lowermost end of frame 12 rests upon a supporting surface 24 and supporting column 26 is mounted upon and extends upwardly from frame 12 intermediate the ends thereof and in substantially perpendicular relationship thereto. The uppermost end of column 26 has a reduced portion 28 adapted to be received within the clamp portion 30 of an elongated arm 32 which extends outwardly from clamp 30 in parallelism with frame 12. A bearing 34 integral with the outermost end of arm 32 has a bore 36 therein which is in substantially perpendicular relationship to arm 32 and frame 12 and which reciprocably receives the shaft 38 of a turntable 40. As clearly illustrated in Fig. 2, a washer 42 is disposed between the lowermost face of turntable 40 and the upper part of bearing 34, while a V-pulley 43 is secured to the lowermost end of shaft 38 which extends below bearing 34.

Turntable 40, which is preferably circular in configuration, is adapted to receive a roof flashing or the like 44 which has an upwardly extending annular flange 46 in the central portion thereof defining a perforation 48.

An eye 50 is attached to the uppermost face of turntable 40 by welding or the like and is located adjacent a point on the axis of shaft 38 and, in turn, turntable 40. An elongated rod 52 having an eyelet 54 on the lowermost end thereof and disposed within eye 50 extends upwardly from the uppermost face of turntable 40 and is swingable with respect thereto.

Jig 10 is adapted to facilitate welding of an elongated tubular member 56 to the upper face of flashing 44, with the longitudinal bore thereof in register with perforation 48. As shown in Fig. 2, the lowermost end of tubular member 56 is disposed over and is in engagement with flange 46 of flashing 44. The rod 52 is of sufficient length that the uppermost end thereof extends beyond the outermost end of member 56, and means to be hereinafter described is provided for maintaining tubular member 56 in position over flashing 44.

Disposed within tubular member 56 is an elongated, cylindrical sleeve 58 which is constructed of metal having high heat dissipating characteristics, such as cast iron, and which is adapted to rest on the upper face of turntable 40. The external diameter of sleeve 58 is substantially equal to the internal diameter of annular flange 46 so that sleeve 58 is in close proximity to flange 46 and tubular member 56.

Rod 52 has an enlarged portion 62 which extends beyond the uppermost end of sleeve 58, the outermost end of enlarged portion 62 being suitably threaded. A frusto-conical stop 64 is reciprocably mounted on enlarged portion 62 and is removable from rod 52. The uppermost end of stop 64 is substantially larger and the lowermost end of the same substantially smaller than the internal diameter of sleeve 58, so that when stop 64 is moved downwardly into engagement with the upper end of sleeve 58, an intermediate portion of stop 64 engages sleeve 58 to maintain the axes of rod 52 and stop 64 in substantial alignment.

Another frusto-conical element 66 is disposed on the reduced portion of rod 52 and is adapted to engage the outermost end of member 56. The uppermost end of element 66 is substantially larger and the lowermost end of the same is substantially smaller than the internal diameter of member 56, so that when element 66 is brought into engagement with member 56, the axes of element 66 and tubular member 56 are maintained in alignment.

Means for holding the stop 64 and element 66 in engagement with the sleeve 58 and member 56 respectively comprises a wing nut 68 threaded on the enlarged portion 62 of rod 52 and the reduced portion thereof respectively.

A prime mover 70 is mounted on the upper end of frame 12 and is operably connected with a speed reducer 72 which is, in turn, coupled with V-pulley 43 by pulley and belt means 74.

The manner in which jig 10 may be utilized to facilitate welding of a tubular member 156 to flashing 144 is illustrated in Fig. 3 wherein it can be seen that a plane passing through the lowermost end of member 156 is disposed at an angle to the longitudinal axis of member 156. In order to adapt jig 10 for use with members such as 156, another heat dissipation sleeve 158 is provided within member 156 and which has the lowermost end thereof cut off at an angle equal to the angular disposition of the lowermost end of member 156. In this manner, the longitudinal axes of member 156 and sleeve 158 remain in substantial alignment and because of the pivotal connection of rod 52 to turntable 40, rod 52 may be swung to a position on the axes of member 156 and sleeve 158.

In operation, sleeve 58 is moved downwardly over rod 52 until the lowermost end thereof engages turntable 40, whereupon stop 64 is placed on rod 52 and moved downwardly therealong until brought into engagement with the upper end of sleeve 58. The lower wing nut 68 is then placed on rod 52 and screwed downwardly until stop 64 firmly engages sleeve 58. Flashing 44 is next placed in position on turntable 40 with flange 46 disposed in circumscribing relationship to sleeve 58, and the tubular member 56 is placed in position over rod 52 with the lowermost end thereof surrounding flange 46. Element 66 is next placed over the outermost end of rod 52 and is snugged down against the outer end of member 56 by outer wing nut 68 screwed on rod 52. Member 56 is now in position to be welded to flashing 44 and thus, prime mover 70 is actuated to rotate turntable 40 at a predetermined rate of speed. Such rate of speed will depend upon the materials being welded and may be controlled by varying the output speed of reducer 72. It is also contemplated that actuation of prime mover 70 may be controlled by a foot operated switch.

The angularity of frame 12 with respect to support 24 may be varied at will by merely moving clamps 18 vertically on rods 16 and securing the same in position with take-up means 22.

The manner in which jig 10 facilitates lead welding of tubular members to perforated flashings is readily apparent when it is recognized that because of the tilted position of turntable 40, molten material produced during the welding operation may be maintained at the top of the line of engagement between the member and the flashing, and gravitation of the molten material away from the area being welded before the same solidifies is precluded. It can be recognized that if flashing 44 were disposed horizontally with member 56 extending upwardly therefrom, it would be extremely difficult to maintain the molten material in the crevice between the flashing and the member. By the same token, when flashing 44 is disposed vertically, with tubular member 56 extending outwardly therefrom, the molten material being deposited during the welding operation tends to gravitate away from the particular area which is being heated before it can solidify and therefore, a large amount of the material is wasted before a satisfactory joint can be formed.

However, by tilting turntable 40 and placing flashing 44 and member 56 thereon as explained above, it can be seen that a plane passing through flashing 44 is at a lesser angle with respect to support 44 than would be the case of a plane passing through flashing 44 when the latter was disposed vertically, and the molten material will remain substantially adjacent the area being heated and will not gravitate away from such area before solidifying. Furthermore, because of the angular disposition of flashing 44, and by heating the top portion of the line of engagement between flashing 44 and member 56, the molten material tends to gravitate into the crevice between the flashing and the member and a much stronger joint is formed therebetween.

Although jig 10 has been described as especially useful for lead welding operations, it is manifest that the same may be utilized for other similar processes wherein two parts are joined with initially molten material produced.

Another important feature of jig 10 relates to the provision of heat dissipation sleeve 58, which is located in a position to absorb excess heat produced during the welding and to dissipate such excess heat over a large area to thereby obviate the dange of the welding torch burning through member 56 or flashing 44. Transfer of heat from member 56 and/or flashing 44 to sleeve 58 is highly efficient because of the proximity of the latter to member 56 and flashing 44.

Welding of tubular members such as 156 to flashings 144 may be accomplished by utilization of jig 10 in substantially the same manner as that described with respect to welding of members 56, with the exception of the use of sleeve 158 in lieu of sleeve 58. It can be appreciated that the lowermost end of sleeve 158 must be constructed to conform with the lower end of tubular member 156 so that the longitudinal axes of sleeve 158 and member 156 remain in alignment. Jig 10 may be made universally adaptable for all types of vent pipes by merely providing a sleeve 158 conforming with the particular tubular member to be welded to flashing 44.

Having thus described the invention what is claimed as new and desired to be secured by Letters Patent is:

1. In a jig for welding roof flashings, a relatively flat, tiltable turntable adapted to receive a perforated plate with the axis of the perforation in alignment with the axis of the turntable; means for holding an elongated tubular member, which is to be joined to the plate by deposition of molten material on proximal portions of said plate and the member, in position against the plate and in register with said perforation said means being swingably connected to the turntable substantially within the major plane thereof and adapted to extend upwardly through the member regardless of the angle thereof relative to the plate and to engage the uppermost end of the member; means connected with the turntable for rotating the same at a predetermined rate of speed whereby molten material being deposited may be maintained at the top of the line of engagement between the plate and member when the turntable is tilted; a heat dissipation sleeve having an external diameter slightly less than the internal diameter of the member adapted to be mounted within the member and resting on the turntable whereby burn-through of the member and plate is prevented; and means carried by said first mentioned means for maintaining said sleeve in proper relationship to the member.

2. In a jig for welding roof flashings, a relatively flat, tiltable turntable adapted to receive a perforated plate with the axis of the perforation in alignment with the axis of the turntable; means for holding an elongated tubular member, which is to be joined to the plate by deposition of molten material on proximal portions of said plate and the member, in position against the plate and in register with said perforation, said means including an elongated rod swingably connected to the turntable at a point adjacent said axis of the turntable substantially within the major plane thereof and adapted to extend upwardly through the member, and an element slidably mounted on the rod and adapted to engage the outermost end of the member and to maintain the longitudinal axes of the rod and the member in substantial alignment; means connected with the turntable for rotating the same at a predetermined rate of speed whereby molten material being deposited may be maintained at the top of the line of engagement between the plate and member when the turntable is tilted; an elongated heat dissipation sleeve having an external diameter slightly less than the internal diameter of the member adapted to be mounted within the member and resting on the turntable whereby burn-through of the member and plate is prevented; and a stop slidably mounted on the rod and engageable with the uppermost end of the sleeve for maintaining the longitudinal axes of the sleeve and the rod in alignment and the sleeve in engagement with the turntable.

3. A jig as set forth in claim 2 wherein said stop is frusto-conical in configuration, the diameter of the normally uppermost end of the stop being larger and the diameter of the normally lowermost end of the same being smaller than the diameter of the normally uppermost end of the sleeve.

4. A jig as set forth in claim 3 wherein there is provided means removably disposed on the rod for maintaining the element and stop in tight engagement with the member and sleeve respectively.

References Cited in the file of this patent

UNITED STATES PATENTS

| | | |
|---|---|---|
| 1,550,651 | Charter | Aug. 18, 1925 |
| 1,901,634 | Dawkins | Mar. 14, 1933 |
| 2,314,788 | Innes | Mar. 23, 1943 |